United States Patent [19]

Wolfe

[11] 4,246,630

[45] Jan. 20, 1981

[54] ULTRAVIOLET EMITTING CE ALKALINE EARTH ALUMINATE LAMP PHOSPHORS AND LAMPS UTILIZING SAME

[75] Inventor: Robert W. Wolfe, Wysox, Pa.

[73] Assignee: GTE Products Corporation, Stamford, Conn.

[21] Appl. No.: 105,327

[22] Filed: Dec. 19, 1979

[51] Int. Cl.³ .................. C09K 11/46; H01J 1/63; G03B 27/54
[52] U.S. Cl. .................. 362/260; 252/301.6 P; 313/486; 355/67
[58] Field of Search .................. 362/260; 252/301.4 R, 252/301.4 P, 301.6 R, 301.6 P; 313/485–487; 355/67, 70

[56] References Cited

U.S. PATENT DOCUMENTS

| | | | |
|---|---|---|---|
| 2,590,411 | 3/1952 | Isenberg | 252/301.6 R |
| 2,774,903 | 12/1956 | Burns | 362/260 X |
| 3,484,383 | 12/1969 | Hoffman | 252/301.6 P |
| 3,729,257 | 4/1973 | Gunto et al. | 355/67 |
| 4,088,922 | 5/1978 | Wolfe | 313/486 |
| 4,150,321 | 4/1979 | Schetters et al. | 313/486 |
| 4,153,572 | 5/1979 | Wolfe | 252/301.4 R |

Primary Examiner—Donald A. Griffin
Attorney, Agent, or Firm—John C. Fox

[57] ABSTRACT

Ce-substituted alkaline earth magnetoplumbite aluminate phosphors containing 15 to 50 mole percent of cations (exclusive of Al) as Ce exhibit intense relatively narrow band emissions between 320 and 350 nanometers, making such phosphors especially useful in applications such as therapeutic or cosmetic skin treatments, or the stimulation of chemical reactions.

3 Claims, 3 Drawing Figures

ULTRAVIOLET EMITTING CE ALKALINE EARTH ALUMINATE LAMP PHOSPHORS AND LAMPS UTILIZING SAME

CROSS REFERENCE TO RELATED APPLICATIONS

Applicant's Ser. No. 099,063 filed Nov. 30, 1979, relates to aluminate lamp phosphors co-activated with Gd and Ce and Applicant's Ser. No. 099,064 filed Nov. 30, 1979, relates to LaMg aluminate lamp phosphors activated by Eu.

BACKGROUND

This invention relates to aluminate phosphors emitting in the ultraviolet region of the electromagnetic spectrum, and more particularly relates to such phosphors containing Sr and/or Ca in combination with Ce, and also relates to lamps utilizing such phosphors.

Cerium activated aluminate phosphors are, in general, well known to the art. In particular, there has been considerable activity with phosphors based on the hexagonal aluminate compounds which consist of interleaved layers of spinel-like aluminum oxide and Me—O layers, where Me=Ca, Sr, Ba, La, Ce, K, Na and Cs. In addition, it is possible to replace some of the Al ions with Mg, Li, Zn, Ga and Sc. Historically, the alkali compounds have been called "$\beta$-Al$_2$O$_3$" compounds, while the alkaline earth and rare earth compounds have been called "magnetoplumbite" compounds. Structural differences between these two classes are small. However, the alkali aluminates, where Me=Na, K, Cs, are not generally useful in conventional low pressure mercury vapor lamps due to a rapid deterioration of the phosphor in the lamp environment. British Pat. No. 1,452,083 to Philips Electronics and Associated Industries discloses many hexagonal aluminate phosphors with a variety of activators including Ce. Mg aluminate and alkaline earth (Ca or Sr) Mg aluminate phosphor compositions containing Ce ranging from about 0.03 mole percent (Example 1) are disclosed.

Isenberg, in U.S. Pat. No. 2,590,411, discloses alkaline earth aluminate phosphors activated by Ce. Wolfe, in U.S. Pat. No. 4,153,572, discloses YMg aluminates activated by Ce, and in U.S. Pat. No. 4,088,922, discloses Mg aluminates activated by Ce.

Aluminate phosphors coactivated by Ce and another element are also known. Coactivators include Mn and Dy (British Pat. No. 1,452,083) and Tb (British Pat. No. 4,026,816).

More recently Stevels, in *J. Electrochem. Soc.*, Vol. 4, pp. 588-594, April '78, investigated luminescence of hexagonal aluminate phosphors containing Ca, Sr, Mg, Ba and La.

SUMMARY OF THE INVENTION

This invention relates to Ce-substituted alkaline earth magnetoplumbite aluminate phosphors represented by the molar formula:

$$y(Me_{1-x}Ce_x)Al_{12}O_{18+y+(xy/2)},$$

where
Me=Sr and/or Ca and
x=0.15 to 0.50
y=0.6 to 1.0 and also relates to fluorescent lamps incorporating them.

Such phosphors are more efficient than prior art alkaline earth magnetoplumbite aluminate phosphors containing Ce, and are narrower band emitters than alkaline earth Ce aluminate phosphors which also contain Mg.

Such phosphors exhibit optimum energy output within the region from 320 to 350 nanometers and minimal energy output below 320 nanometers and above 350 nanometers, and accordingly are useful in uv applications such as medical or cosmetic applications, and uv-initiated or accelerated chemical reactions, such as in photocopying or photocuring.

When the phosphors of the invention are incorporated into a standard type fluorescent lamp, such as a 40 watt low pressure mercury vapor (LPMV) lamp, the lamp will exhibit a doublet uv emission peak centered at about 330 nanometers with a half-height bandwidth of about 42 nanometers.

BEST MODE FOR CARRYING OUT THE INVENTION

Phosphors of this invention may be prepared readily by blending the required amounts of appropriate starting materials and firing in a reducing atmosphere at an elevated temperature for a modest time interval. Time, temperature and reducing atmosphere are not critical, but a mixture of nitrogen and hydrogen or hydrogen are preferred, a temperature range from 1450° C. to 1750° C. is also preferred, at a time interval of from 1 to 5 hours. The particular starting materials are not critical, but should of course be chosen so that they yield during firing the required composition. Compounds which upon heating decompose to oxides such as hydroxides, carbonates, sulfates, etc. are acceptable. Preferred starting materials are Al(OH)$_3$, and the carbonates or fluoride salts of Ca, Sr and Ce.

EXAMPLE

Preparation of Ca$_{0.621}$Ce$_{0.279}$Al$_{12}$O$_{19.0}$ (Me=Ca, y=0.9, x=0.31)

35.5 grams of CaCO$_3$ and 27.4 grams of CeO$_2$ are blended with 545.8 grams of Al(OH)$_3$. The mixture is fired at 1600° C. for 4 hours in a dissociated ammonia atmosphere (25 Vol % N$_2$, 75 Vol % H$_2$). The resulting phosphor of the above molar composition is essentially in the hexagonal magnetoplumbite phase.

Mg is to be avoided in these phosphor compositions, since its presence in greater than about 0.25 moles per mole of phosphor tends to quench the intense Ce doublet peak of interest herein, and also tends to increase the band width of the emission.

Zn substitutions may be made in these phosphors but offers no improvement over the present invention. Substitution of small amounts of Ba, La and Y may also be tolerated with negligible effects on the luminescent properties. For example, up to 40% barium can be substituted for Sr or Ca in these compositions with negligible effects on the uv doublet peak positions bandwidth or intensities. At Ba levels higher than 40% the doublet washes out and the peak shifts toward longer wavelengths with an accompanying increase in the bandwidth. Similarly, up to 20% La can be substituted for Sr or Ca. However, compositions with higher La contents develop an undesirable blue emission peak as the blue emitting $LaAl_{11}O_{19}$:Ce phase is formed.

The currently especially preferred compositions have the approximate formulae:

$$y(Me_{1-x}Ce_x)Al_{12}O_{18+y+(xy/2)}$$

where
Me = Sr and/or Ca
x = 0.2 − 0.4 and
y = 0.8 − 0.95

Figure 1:
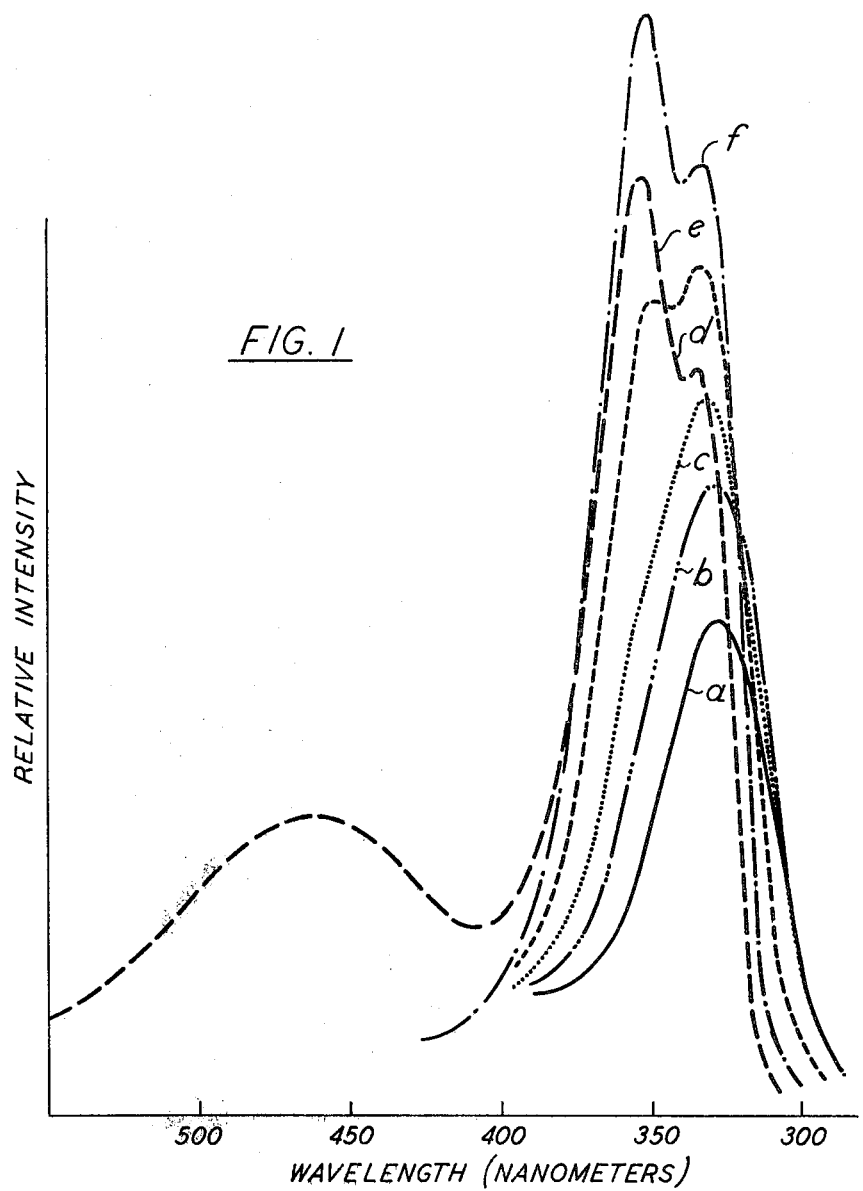
FIG. 1 is a graph of relative intensity of emission versus wavelength of emission in nanometers for several Ce-substituted alkaline earth magnetoplumbite phosphors.

FIG. 1 shows emission curves from plaque samples in the system $$y(Ca_{1-x}Ce_x)Al_{12}O_{18+y+(xy/2)},$$

where y = 0.8.

The samples were prepared according to the procedure of the Example and were carefully packed into a plaque. There were then excited by 254 nm radiation and the emission spectra measured. The curves presented are uncorrected for phototube response. Cerium content is expressed as a mole percent of the total cation content exclusive of Al, i.e., (Ce+Ca) ion content. Actual molar formulas and corresponding mole percents of Ce are shown below in Table I.

TABLE I

| Curve | Composition | Mole Percent Ce |
|---|---|---|
| (a) | $Ca_{0.79}Ce_{0.01}Al_{12}O_{18.80}$ | 1.25 |
| (b) | $Ca_{0.77}Ce_{0.03}Al_{12}O_{18.81}$ | 3.75 |
| (c) | $Ca_{0.75}Ce_{0.05}Al_{12}O_{18.82}$ | 6.25 |
| (d) | $Ca_{0.70}Ce_{0.10}Al_{12}O_{18.85}$ | 12.5 |
| (e) | $Ca_{0.60}Ce_{0.20}Al_{12}O_{18.90}$ | 2.50 |
| (f) | $Ca_{0.4}Ce_{0.4}Al_{12}O_{19.00}$ | 50.0 |

At the smaller concentrations of cerium, curves (a), (b) and (c), the emission peak is a singlet, total power output compared to phosphors of this invention is low. Curves (c) and (d) begin to show the evidence of doublet formation. In curve (e), the doublet nature of the peak is clearly evident, as is the greater intensity of emission compared to that of the lower Ce content phosphors. Curve (e) thus represents a more efficient phosphor in power output per given excitation level than the preceeding examples. Also, the short wavelength tail of curve (e) has moved farther into the longer wavelength region than the preceeding examples and thus emits less radiation below 315 nanometers. Such radiation, i.e., in the range 280 to 315 nanometers, is referred to as UVB, while radiation in the range 315 to 380 nanometers is known as UVA. Finally, curve (f) is shown as the upper limit of cerium concentration claimed in this invention. A third emission peak in the visible region at about 460 nm is evident. This peak is believed to arise from the decomposition of the solid solution into two phases: the saturated alkaline earth-rich magnetoplumbite solid solution of this invention, and a cerium-rich magneto plumbite phase which exhibits a single broad band emission curve at about 460 nm. Compositions with Ce greater than 50 mole percent would show the blue band increasing in intensity and the uv band diminishing.

Figure 2:
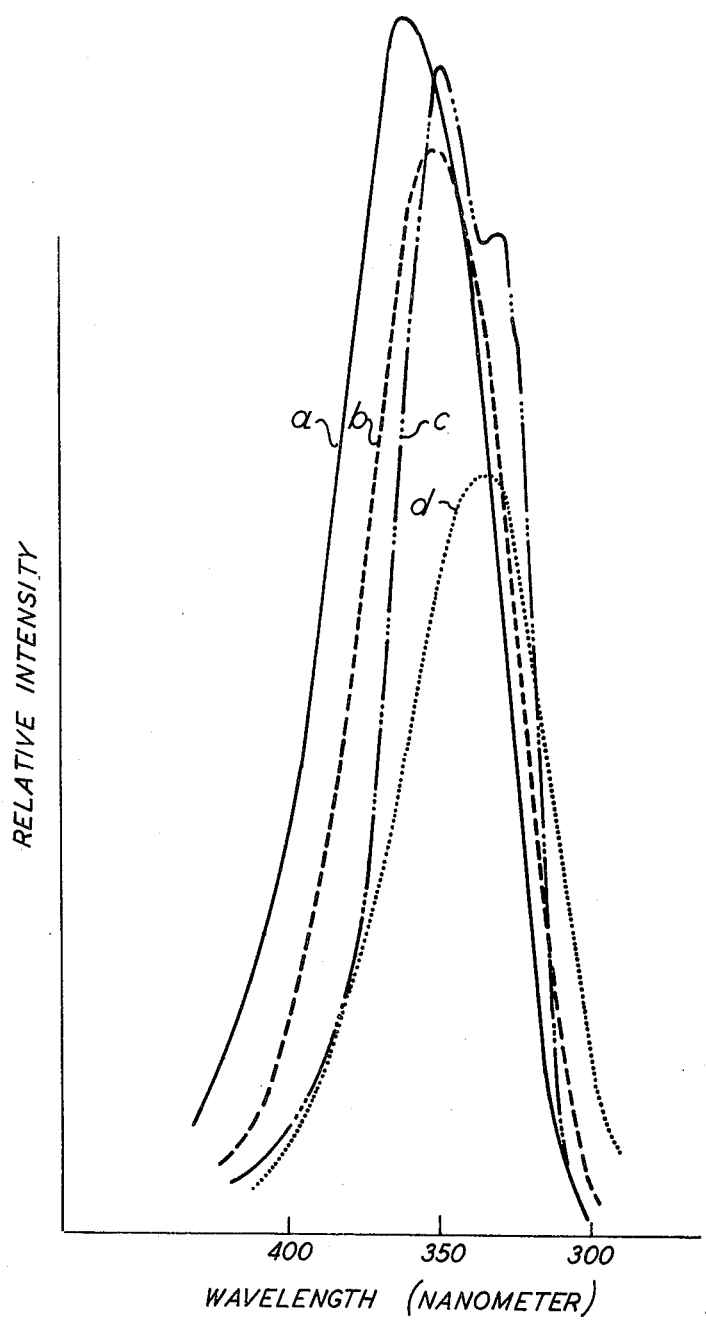
FIG. 2 is a graph similar to the graph of FIG. 1 for a phosphor of this invention and for several Ce-substituted alkaline earth aluminate phosphors containing Mg.

FIG. 2 shows emission curves for a phosphor of this invention compared to other state-of-the-art magnetoplumbite phosphors, including a magnesium-substituted magnetoplumbite phosphor based on $SrAl_{12}O_{19}$. Curve (c) ($Ca_{0.621}Ce_{0.279}Al_{12}O_{19}$) (% Ce=31%), the Example composition, clearly shows a narrower bandwidth compared to: (a) ($Ce_{0.74}Ba_{0.05}Mg_{0.79}Al_{11}O_{18.4}$), and (b) ($Ce_{0.49}Sr_{0.3}Mg_{0.61}Al_{11}O_{18.1}$). This relatively narrow bandwidth gives the phosphors of this invention an advantage in applications where maximum radiation in the UVA range is desired with minimum radiation in the UVB range. Such applications could include, for example, medical and cosmetic skin treatments, and uv-initiated or accelerated chemical reactions. Curve (d) ($Sr_{0.621}Ce_{0.279}Mg_{0.45}Al_{12}O_{19.5}$) illustrates the effect of substituting magnesium into phosphors of this invention. The peak doublet is washed out and the emission intensity is considerably quenched. Magnesium substitutions are thus seen to be undesirable at the cerium concentration levels of this invention.

Figure 3:
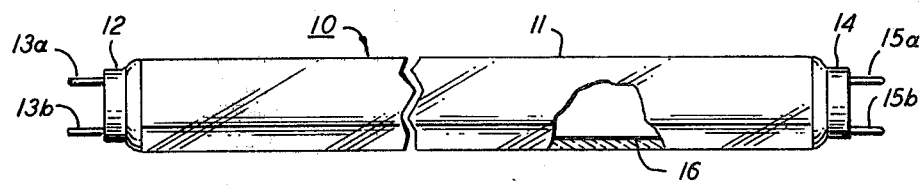
FIG. 3 is a front elevation view of a fluorescent lamp, partly cut away to show a fluorescent layer incorporating a phosphor of this invention.

Referring now to FIG. 3, there is shown a plan view of a LPMV lamp 10 of a conventional type, including glass envelope 11, end caps 12 and 14, with protruding connector pins 13a and b and 15a and b, a luminescent layer 16 coating the inside surface of envelope 11. Envelope 11 contains a fill gas comprising Ar and Hg atoms. Layer 16 incorporates a phosphor composition of this invention.

For such a lamp incorporating a phosphor of the Example composition, energy output after 100 hours operating time is as follows:
watts output less than 315 nm (UVB) = 0.24
watts output between 320 and 350 nm = 7.40
watts output between 350 and 400 nm = 1.6
100 hour maintenance* (%) 91.0

*Maintenance is defined as the ratio of the energy output of the lamp divided by the initial energy output. For example, 100 Hour Maintenance (%) =

$$\frac{\text{Energy output at 100 hrs.}}{\text{Energy output at 0 hrs.}} \times 100$$

Table III lists lamp data for phosphor compositions of Table II, including phosphors of this invention when compared to state-of-the-art phosphor compositions. All lamp data is for standard type 40 watt LPMV lamps whose lamp glass spectral transmission decreases from about 90 percent at about 350 nm to almost zero at 270 nm. Thus it is to be understood that some of the UVA energy and a substantial part of the UVB energy of the phosphors is absorbed by the lamp glass, and that the reported values are for the lamps, not for the phosphors.

TABLE II

| Sample No. | Source | Composition |
|---|---|---|
| 1 | Invention | $Ca_{0.621}Ce_{0.279}Al_{12}O_{19}$ |
| 2 | Invention | $Ca_{0.483}Ce_{0.217}Al_{12}O_{19.8}$ |
| 3 | Invention | $Sr_{0.621}Ce_{0.279}Al_{12}O_{19}$ |
| 4 | U.S. 4,088,922 | $Ce_{0.49}Sr_{0.3}Mg_{0.61}Al_{11}O_{18.1}$ |
| 5 | U.S. 4,088,922 | $Ce_{0.74}Ba_{0.05}Mg_{0.79}Al_{11}O_{18.4}$ |
| 6 | U.S. 4,153,572 | $Ce_{0.61}Y_{0.15}Mg_{0.61}Al_{11}O_{18.2}$ |
| 7 | Br. 1,452,083 | $Ce_{1.0}Mg_{1.0}Al_{11}O_{19}$ |

TABLE II-continued

| Sample No. | Source | Composition |
|---|---|---|
| 8 | Conventional uv Phosphor | $BaSi_2O_5:Pb$ |

TABLE III

| Sample No. | Emission Peak Center of Gravity nm | Energy in Watts at 100 hrs. | | | 100 hr Lamp Maint. % |
|---|---|---|---|---|---|
| | | (UVB)< 315 nm) | 320–350nm | 350–400nm | |
| 1 | 330 | .24 | 7.4 | 1.5 | 91.0 |
| 2 | 330 | .36 | 7.1 | 1.3 | 91.0 |
| 3 | 332 | .27 | 6.3 | 1.1 | 90.0 |
| 4 | 340 | .64 | 7.8 | 2.8 | 94.3 |
| 5 | 344 | .23 | 7.4 | 3.9 | 96.0 |
| 6 | 349 | .12 | 4.8 | 4.0 | 96.1 |
| 7 | 365 | .06 | 2.1 | 4.2 | 90.0 |
| 8 | 349 | .15 | 3.5 | 4.7 | 76.9 |

Table III shows that phosphors of this invention offer the best compromise between maximum output in the narrow spectral region of 320–350 nm with minimum power output elsewhere in the uv range of the electromagnetic spectrum.

INDUSTRIAL APPLICABILITY

Phosphors of this invention are useful in applications where an efficient narrow band emitting phosphor with maximum energy output in the 320–350 nm range is required. Such applications may include medical or cosmetic uses, or use for other industrial applications where narrow band emission is sought, such as photocopy light sources or photocuring processes.

I claim:

1. Cerium substituted alkaline earth magnetoplumbite phosphors represented by the molar formula:

where
Me = Sr and/or Ca and
x = 0.15–0.50
y = 0.60–1.0

2. Compositions according to claim 1 where x = 0.2–0.4, and y = 0.8–0.95.

3. Fluorescent lamp incorporating phosphor of the composition of claim 1.

* * * * *